Patented Jan. 2, 1923

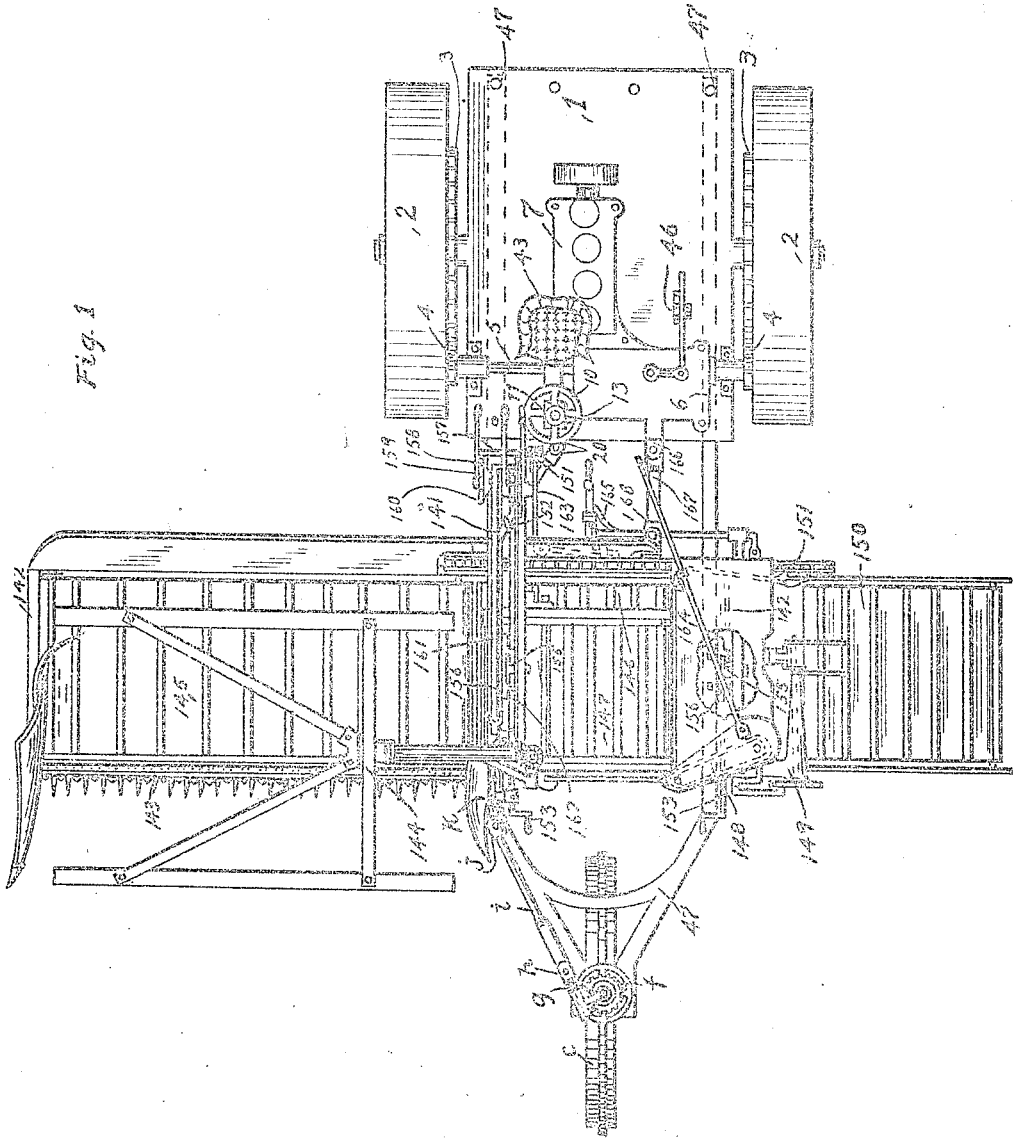

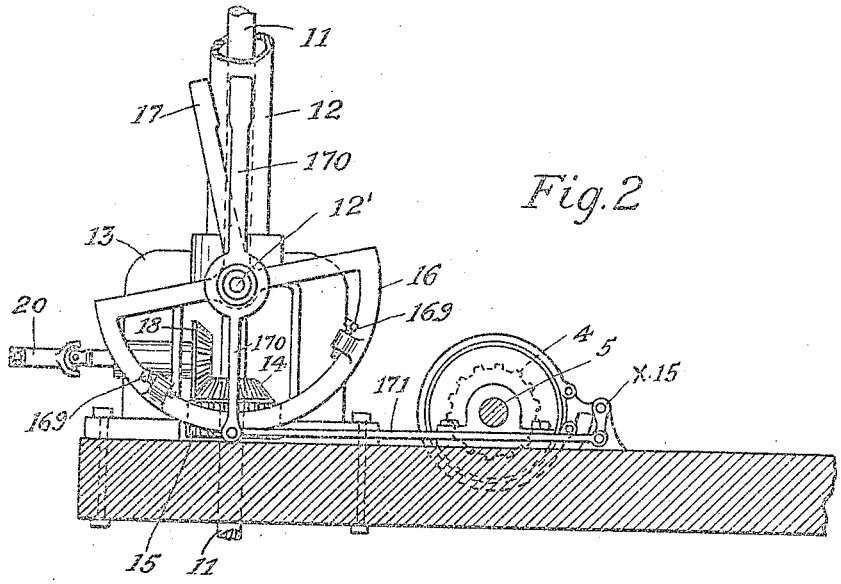
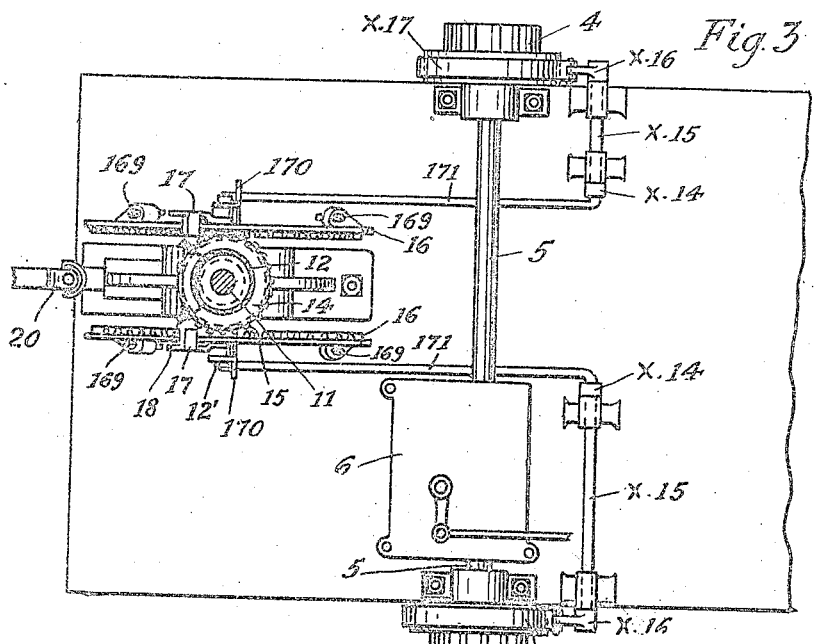

1,440,496

UNITED STATES PATENT OFFICE.

ANDREAN G. RONNING AND ADOLPH RONNING, OF MINNEAPOLIS, MINNESOTA.

BINDER ATTACHMENT.

Original application filed March 6, 1916, Serial No. 82,516. Divided and this application filed June 30, 1919. Serial No. 307,735.

*To all whom it may concern:*

Be it known that we, ANDREAN G. RONNING and ADOLPH RONNING, citizens of the United States, residing at Minneapolis, in the county of Hennepin and State of Minnesota, have invented certain new and useful Improvements in Binder Attachments, of which the following is a specification.

Our invention relates to a binder attachment and an object is to provide a device of this character which may be attached to a tractor for operation thereby. This application is a division of our prior application Serial Number 82,516, filed March 6, 1916, which subsequently to the filing of the present application matured into Patent Number 1,340,461, dated May 18, 1920.

The full objects and advantages of our invention will appear in connection with the detailed description thereof and the novel features embodied in our inventive idea will be particularly pointed out in the claim.

In the accompanying drawings, Fig. 1 is a top plan view. Fig. 2 is an enlarged detail view illustrating certain parts of the steering mechanism. Fig. 3 is a plan view of a portion of the tractor illustrating the steering mechanism, certain parts being in section.

The main frame 1 of the tractor is carried by drive wheels 2 on the inner sides of which are secured spur gears 3 meshing with spur gears 4 which are secured to the free outer ends of differential shafts 5 which are suitably journaled on the main frame 1 and in the differential housing 6 and are connected to the engine 7 by customary differential and clutch mechanism employed for such purposes. The engine 7 may be of any customary construction and is preferably mounted on the main frame 1 at substantially the middle thereof. A steering wheel 10 is attached to a shaft 11 suitably mounted in a housing 12 carried by a casting 13 attached to the front portion of the frame 1. The grain harvester is attached in front of the tractor mechanism and is additionally supported by a frame 47. The members of the frame 47 converge at their front ends and are supported by a guiding wheel *e* mounted for turning movement by means of a vertical shaft having a worm wheel *f* secured to its upper end. This worm wheel is engaged by a worm secured to the front end of a shaft *g* which is suitably journaled in the frame 47 and is connected at its outer end through an ordinary knuckle *h* with a shaft *i*. The latter shaft is connected by a knuckle *j* to a shaft *k* which is journaled in the frame 47, and is connected at its rear end to a knuckle 141 which in turn is connected to a universal joint 20 operated from the lower end of the steering shaft 11, previously referred to. The harvester frame 142 is provided with sickle mechanism 143 for cutting the standing grain off the field, a reel mechanism 144 for directing the cut grain upon an endless platform conveyor belt 145 which moves transversely with relation to the traveling movement of the tractor and delivers to the endless conveyor belts 146 and 147, which in effect constitutes a longitudinally divided belt and which deliver to the butt apron mechanism 148 and to the packing and binding mechanism 149 by which the received grain is packed and bound into sheaves which are delivered to a bundle carrier 150 actuated by operative mechanism 151. The construction and mode of operation of the principal parts of such grain harvesters are so well-known and understood that it is not necessary to give a detailed and minute description thereof. The manner of mounting the harvester mechanism on the frame 47, as well as the means for operating the same from the tractor are special features of the improvement. The left-hand member of the frame 47 viewed from the position of the operator replaces the bull wheel ordinarily used in grain binders. The right-hand member of the frame 47 is adjacent and parallel to the outside of the beam 152 which is rigidly secured to the harvester frame 142. The left-hand member of the frame 47 is pivotally attached to the harvester frame 142 at about the same place and substantially in the same manner as the bull wheel is usually attached to the frame 142 with freedom for vertical adjustment by means of crank-shafts 153 which are provided at their rear ends with usual adjusting mechanism. Castings 155 are suitably mounted in castings 156 with freedom for vertical adjustment, the castings 156 being secured by bolts to the frame 47 and the castings 155 being secured to the harvester frame. Therefore, by turning the shafts 153 the binder may be raised and lowered bodily with relation to the frame 47. The harvester mechanism being pivotally attached to the frame 47 in the usual manner of attachment may be tilted by means of a latch piece 157 which is pivotally attached at its lower end to the rear of the beam 152, and is pivotally attached at its upper end to a crank arm 158 which is attached to a lever handle 159 provided with the usual latch piece to engage the teeth of a quadrant 160. The reel mechanism 144 is adjustable in the usual manner by means of the customary guide rods 161 and 162, which are operated by means of the usual lever mechanism 163 attached to the beam 152 within easy reach of the operator on the seat 43. The butt apron mechanism 148 is adjustable in the usual way by means of the guide rod adjusting mechanism 164, while the packing and binding mechanism 149 is adjusted in the usual way by means of the lever mechanism 165. The drive shaft of the usual driving mechanism is provided with a universal joint 166 which is suitably attached at its front end to the rear end of a shaft 167 which is attached at its front end to a universal joint 168 connected to the pitman drive shaft ordinarily employed in grain harvesters to supply power for operating the running parts of the harvester. By attaching the frame 47 to the tractor in the manner specified, coupling the universal joint 166 to the drive shaft of the driving mechanism, and coupling the steering shaft $k$ to the universal joint 20 of the steering mechanism the combined tractor grain harvester is ready for harvesters' service, since all of the adjusting mechanism of the harvester remains permanently attached. All of the harvester mechanism is ahead of the tractor so that the operation of the harvester may be readily watched and controlled by the operator.

The mechanism by means of which the machine may be caused to make square turns will now be described, with reference particularly to Figs. 2 and 3. The steering shaft 11 carries near its lower end, a beveled gear 14 on the lower side of which is a gear 15 which meshes with teeth on the inner side of two semicircular racks 16 carried by foot pedal members 17 which are pivoted at 12' to the sides of the bifurcated casting 13. By turning the steering wheel 10 in one direction or the other, as desired, the members 17 will move back and forth, or, vice versa, and by moving the members 17 back and forth the steering wheel 10 with the shaft 11 and attached gear 14 will turn back and forth. The beveled gear 14 meshes with a beveled gear 18 which is secured to one member of the universal joint 20 previously referred to. The semicircular members 16 are provided with lugs for receiving set-screws 169 which are adapted to be brought into engagement with levers 170 when the members 16 are turned sufficiently for this purpose. If by the operation of the steering wheel 10 toward the left, the guiding wheel $c$ be turned far enough to the left, the left-hand set-screw 169 will engage the left-hand lever 170 which is pivotally attached at its lower end to the front end of a rod 171 which by means of a crank arm $x^{14}$ is connected to a rotatable rod $x^{15}$, which in turn is connected by a crank arm $x^{16}$ to a brake band $x^{17}$ of ordinary construction which surrounds a brake drum on the left-hand differential shaft 5. This stops the left-hand drive wheel of the tractor and enables the harvester to turn square corners or be swung completely around by movement of the right-hand drive wheel. In like manner, if the guiding wheel $c$ be turned far enough to the right, the set-screw 169 on the right-hand member 16 will engage the right-hand lever 170 and apply the brake to the right-hand differential shaft 5 and stop the right-hand drive wheel so that the harvester will swing in the opposite direction.

We claim:

In a machine of the class described, the combination of a main frame, drive wheels supporting said frame, an engine mounted on said frame, differential shafts interposed between said engine and said drive wheels, a guiding wheel frame attached to the front of said main frame, a guiding wheel supporting said guiding wheel frame, a steering wheel, a shaft mounted on said main frame and to the upper end of which said steering wheel is secured, connections between said shaft and said guiding wheel, a gear secured to the lower end of said shaft, a pair of segmental racks meshing with opposite sides of said gear, foot pedals attached to said segmental racks, pivotally mounted levers, projections on said segmental racks adapted to engage and turn said levers, brakes for said differential shafts, and connections between said levers and said brakes for applying the brake which is on the side toward which the machine is being turned.

In testimony whereof we hereunto affix our signatures.

ANDREAN G. RONNING.
ADOLPH RONNING.